US009895685B2

(12) United States Patent
Hong et al.

(10) Patent No.: US 9,895,685 B2
(45) Date of Patent: Feb. 20, 2018

(54) METHOD OF PREPARING CATALYST HAVING PT—PD DISPERSED POLYMER ELECTROLYTE MULTILAYERS TREATED WITH SULFURIC ACID

(71) Applicants: SK INNOVATION CO., LTD., Seoul (KR); SK GLOBAL CHEMICAL CO., LTD., Seoul (KR)

(72) Inventors: Suk Joon Hong, Daejeon (KR); Yong Tak Kwon, Daejeon (KR); Hwa Jung Lee, Seoul (KR); Tae Jin Kim, Seoul (KR); Dae Hyun Choo, Busan (KR)

(73) Assignees: SK INNOVATIONS CO., LTD., Seoul (KR); SK GLOBAL CHEMICAL CO., LTD., Seoul (KR)

( * ) Notice: Subject to any disclaimer, the term of this patent is extended or adjusted under 35 U.S.C. 154(b) by 48 days.

(21) Appl. No.: 14/539,496

(22) Filed: Nov. 12, 2014

(65) Prior Publication Data

US 2015/0147267 A1    May 28, 2015

(30) Foreign Application Priority Data

Nov. 26, 2013   (KR) .................. 10-2013-0144273

(51) Int. Cl.

| | |
|---|---|
| *B01J 37/16* | (2006.01) |
| *B01J 37/02* | (2006.01) |
| *B01J 23/44* | (2006.01) |
| *B01J 31/10* | (2006.01) |
| *B01J 35/00* | (2006.01) |
| *C01B 15/029* | (2006.01) |
| *B01J 31/06* | (2006.01) |
| *B01J 31/08* | (2006.01) |

(52) U.S. Cl.
CPC .............. *B01J 37/16* (2013.01); *B01J 23/44* (2013.01); *B01J 31/06* (2013.01); *B01J 31/08* (2013.01); *B01J 31/10* (2013.01); *B01J 35/006* (2013.01); *B01J 35/0013* (2013.01); *B01J 37/0244* (2013.01); *C01B 15/029* (2013.01)

(58) Field of Classification Search
CPC ............................. C01B 15/029; B01J 31/08
See application file for complete search history.

(56) References Cited

U.S. PATENT DOCUMENTS

| | | | |
|---|---|---|---|
| 4,832,938 A | 5/1989 | Gosser et al. | |
| 6,958,138 B1 | 10/2005 | Devic | |
| 7,179,440 B2* | 2/2007 | Escrig ................... | B01J 23/42 |
| | | | 423/584 |
| 8,784,769 B2 | 7/2014 | Chung et al. | |
| 2004/0018143 A1 | 1/2004 | Zhou et al. | |
| 2004/0151658 A1* | 8/2004 | Escrig ................... | C01B 15/029 |
| | | | 423/584 |
| 2009/0291844 A1 | 11/2009 | Hou et al. | |
| 2012/0051999 A1* | 3/2012 | Chung ................... | B01J 23/40 |
| | | | 423/584 |
| 2013/0004411 A1 | 1/2013 | Chung et al. | |
| 2013/0022535 A1 | 1/2013 | Chung et al. | |

FOREIGN PATENT DOCUMENTS

| | | |
|---|---|---|
| CN | 1037874 A | 12/1989 |
| CN | 102421525 A | 4/2012 |

OTHER PUBLICATIONS

Harland, "Properties and Characterization of Ion Exchange Resins," Ion Exchange: Theory and Practice, 2nd. ed., p. 63, Royal Society of Chemistry, Cambridge, Jul. 1994.*
Xu et al., "Pt promotional effects on Pd—Pt alloy catalysts for hydrogen peroxide synthesis directly from hydrogen and oxygen," Journal of Catalysis 285(1), pp. 74-82, Jan. 2012.*
Melada et al., "Direct synthesis of H2O2 on monometallic and bimetallic catalytic membranes using methanol as reaction medium," Journal of Catalysis 237(2), pp. 213-219, Jan. 2006.*
Sterchele et al., "Pd—Au and Pd—Pt catalysts for the direct synthesis of hydrogen peroxide in absence of selectivity enhancers," Applied Catalysis A: General 468, pp. 160-174, Nov. 2013.*
Liu et al., "Direct synthesis of H2O2 from H2 and O2 over Pd—Pt/SiO2 bimetallic catalysts in a H2SO4/ethanol system," Applied Catalysis A: General 339(2), pp. 130-136, May 2008.*
EP2875861 Extended European Search Report, dated Nov. 3, 2015, pp. 1-5.
Campos-Martin et al., Angew. Chem. Int. Ed., (2006), vol. 45, pp. 6962-6984.
Liu et al., Angew Chem. Int. Ed., (2008), vol. 47, pp. 6221-6224.
Samanta et al., Catal. Commun., (2007), vol. 8, pp. 73-79.
Choudhary et al., Appl. Catal. A, (2006), vol. 308, pp. 128-133.
Han et al., Catal. Lett., (2005), vol. 99, pp. 13-19.
Han et al., J. Catal., (2005), vol. 230, pp. 313-316.
Kidambi et al., Chem. Mater. (2005), 17 (2), pp. 301-307.
CN201410696873.0, Office Action, dated Jun. 17, 2016, and English Language Summary (9 pages).
Kim et al., ACS Catalysis, 2012, 2, 1042-1048.

* cited by examiner

*Primary Examiner* — Melvin C Mayes
*Assistant Examiner* — Michael Forrest
(74) *Attorney, Agent, or Firm* — Abelman, Frayne & Schwab

(57) ABSTRACT

Disclosed herein is a method of preparing a catalyst having Pt—Pd dispersed in polymer electrolyte multilayers, suitable for use in production of hydrogen peroxide, wherein the use of the catalyst prepared by forming polymer electrolyte multilayers on an anionic resin support and performing sulfuric acid treatment and loading (insertion or attachment) of Pt—Pd particles can result in high hydrogen conversion, hydrogen selectivity and hydrogen peroxide yield for a long period of time.

17 Claims, No Drawings

METHOD OF PREPARING CATALYST HAVING PT—PD DISPERSED POLYMER ELECTROLYTE MULTILAYERS TREATED WITH SULFURIC ACID

CROSS-REFERENCE TO RELATED APPLICATION

This application claims the benefit of Korean Patent Application No. 10-2013-0144273, filed Nov. 26, 2013, entitled "Method for preparing catalyst having Pt—Pd dispersed polymer electrolyte multi-layer treated with sulfuric acid," which is hereby incorporated by reference in its entirety into this application.

BACKGROUND OF THE INVENTION

1. Technical Field

The present disclosure relates to a method of preparing a catalyst having polymer electrolyte multilayers containing dispersed (inserted or attached) Pt—Pd particles as a metal component, suitable for use in production of hydrogen peroxide. More particularly, the present disclosure relates to a method of preparing a catalyst having Pt—Pd loaded polymer electrolyte multilayers for use in the production of hydrogen peroxide, wherein polymer electrolyte multilayers are formed on an anionic resin support, treated with sulfuric acid and then loaded with Pt—Pd particles, thereby maintaining high activity for a long period of time, and to a method of directly producing hydrogen peroxide from hydrogen and oxygen using a catalyst prepared by the above method.

2. Description of the Related Art

Hydrogen peroxide is weakly acidic and is a colorless liquid miscible with water, and is thus widely utilized as an oxidant, a bleaching agent, etc. Typically useful for the production of hydrogen peroxide is an anthraquinone process, by which 95% or more of the total supply of hydrogen peroxide is produced, as is currently known. An anthraquinone process is carried out via cyclic reaction of hydrogenation of anthraquinone and oxidation as illustrated below.

Hydrogenation (reaction between hydrogen and anthraquinone (Q) to produce anthrahydroquinone (H2Q))

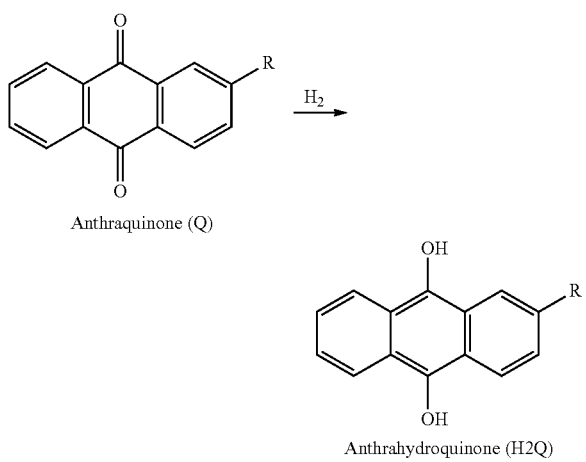

Anthraquinone (Q)

Anthrahydroquinone (H2Q)

Oxidation (oxidation of anthrahydroquinone (H2Q) to produce $H_2O_2$)

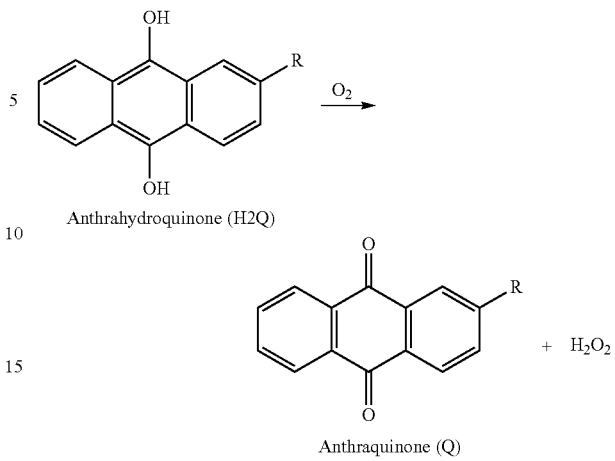

Anthrahydroquinone (H2Q)

Anthraquinone (Q)

In addition thereto, filtration, extraction of hydrogen peroxide and the like are involved between the hydrogenation and the oxidation.

As mentioned above, anthraquinone acts as a carrier, so that oxygen and hydrogen do not come into direct contact with each other. For example, the modified technique of the above process is disclosed in U.S. Patent Application Publication No. 2009/291844, wherein hydrogen peroxide is formed from water and oxygen by cyclic reaction of quinine-hydroquinone in the presence of applied voltage.

However, an anthraquinone process involves a plurality of reactions wherein byproducts are formed by side-reactions through individual steps, thus requiring regeneration of the anthraquinone solution and separation and refining of hydrogen peroxide from the anthraquinone solution [J. M. Campos-Martin, G. Blanco-Brieva, J. L. G. Fierro, Angew. Chem. Int. Ed., vol. 45, pp. 6962 (2006)]. Accordingly, the production of hydrogen peroxide by the anthraquinone process needs high energy and processing costs, undesirably decreasing price competitiveness of hydrogen peroxide.

With the goal of solving the problems with the anthraquinone process, research into direct production of hydrogen peroxide from oxygen and hydrogen without formation of byproducts other than water is ongoing (Liu et al., Angew Chem. Int. Ed., 2008, 47, 6221-6224).

However, this method has the following problems: First, a mixture of oxygen and hydrogen has a high risk of explosion due to a very wide explosion range depending on the mixing ratio thereof. When the concentration of hydrogen in air at 1 atm is 4 to 75 mol %, explosion may occur by an ignition source, and when oxygen is used instead of air, the explosive hydrogen concentration may be further widened to 4 to 94 mol %. As the pressure is higher, such a concentration range may become wider, and thus, the explosion potential may also increase (C. Samanta, V. R. Choudhary, Catal. Commun., vol. 8, pp. 73 (2007)). Upon direct production of hydrogen peroxide using hydrogen and oxygen reactants, the mixing ratio of hydrogen and oxygen may be adjusted in the safe range, and an inert gas such as nitrogen or carbon dioxide may be used to lower the concentration of hydrogen and oxygen. Second, even when hydrogen peroxide, which is very unstable, is produced, it may be easily decomposed into water and oxygen, and a catalyst useful for production of hydrogen peroxide may also become efficient for synthesis of water, making it difficult to obtain high hydrogen peroxide selectivity. As for the production of hydrogen peroxide from oxygen and hydrogen, high-activity catalysts and strong acid and halide additives are under study to solve the above problems.

In this regard, direct production of hydrogen peroxide from hydrogen and oxygen using a catalyst obtained by loading a precious metal on any support such as alumina, silica or carbon has been developed (V. R. Choudhary, C. Samanta, T. V. Choudhary, Appl. Catal. A, vol. 308, pp. 128 (2006)). In order to increase hydrogen peroxide selectivity, the addition of an acid to a solvent to inhibit decomposition of hydrogen peroxide, and the addition of halogen ions to a solvent or catalyst to prevent the formation of water from oxygen and hydrogen are known (Y.-F. Han, J. H. Lunsford, Catal. Lett., vol. 99, pp. 13 (2005); Y.-F. Han, J. H. Lunsford, J. Catal., vol. 230, pp. 313 (2005); WO 2001/5501). Although an additive such as acid or halogen ions may function to increase hydrogen peroxide selectivity, it may cause corrosion problems or may dissolve out the metal such as Pd loaded on a support, undesirably deteriorating the activity of the catalyst and requiring separation and refining after production of hydrogen peroxide. Hence, the use of such an additive may be suppressed if possible.

The present applicant proposed a method of producing hydrogen peroxide (Korean Patent Application Publication No. 2010-122654), wherein hydrogen peroxide may be directly obtained at high yield from oxygen and hydrogen using a catalyst having polymer electrolyte multilayers configured such that metal particles (gold, platinum, palladium, ruthenium, rhodium, iridium, silver, nickel, copper, cobalt, titanium, osmium, etc.) are attached (inserted) on a carrier (support), in the presence of a reaction solvent without the addition of an acid promoter.

However, the above patent merely discloses the use of Pd alone as a metal component. Based on the test results of production of hydrogen peroxide for a long period of time (e.g. 1000 hr or more), when using a catalyst having polymer electrolyte multilayers containing only Pd, high hydrogen selectivity and hydrogen peroxide yield may be maintained but the hydrogen conversion may be decreased. Meanwhile, with the aim of overcoming the problems as above, attempts have been made by the present inventors to test the long-term (e.g. 1000 hr or more) reaction activity using a Pt—Pd binary metal catalyst, resulting in high hydrogen conversion and hydrogen peroxide yield but lowered hydrogen selectivity.

For the synthesis reaction of hydrogen peroxide via direct reaction of hydrogen and oxygen, there is required a catalyst able to maintain high catalytic activities (hydrogen conversion, hydrogen selectivity and hydrogen peroxide yield) for a long period of time.

SUMMARY OF THE INVENTION

Therefore, an embodiment of the present disclosure is intended to provide a catalyst having polymer electrolyte multilayers, which enables hydrogen peroxide to be produced by direct reaction of hydrogen and oxygen while high catalytic activities (hydrogen conversion, hydrogen selectivity and hydrogen peroxide yield) are maintained for a long period of time, compared to the conventional polymer electrolyte multilayers catalysts.

Another embodiment of the present disclosure is intended to provide a method of directly producing hydrogen peroxide from hydrogen and oxygen in the presence of the catalyst having the polymer electrolyte multilayers as above.

According to a first aspect, a method of preparing a catalyst having polymer electrolyte multilayers is provided, including:

a) sequentially forming a cationic polymer electrolyte layer and an anionic polymer electrolyte layer on an anionic support to form polymer electrolyte multilayers;

b) treating the polymer electrolyte multilayers formed in step a) with sulfuric acid; and c) loading or inserting a Pt precursor and a Pd precursor into the polymer electrolyte multilayers treated with sulfuric acid in step b), and reducing the Pt precursor and the Pd precursor by a reductant to form Pt—Pd metal particles dispersed in the polymer electrolyte multilayers, wherein the Pt/Pd atomic ratio in the reduced Pt—Pd metal particles is 0.02 to 0.15.

In an exemplary embodiment, step a) may be repeated two or more times.

In an exemplary embodiment, step a) may be performed by bringing a cationic polymer electrolyte solution and an anionic polymer electrolyte solution into sequential contact with the anionic support.

According to a second aspect, a method of producing hydrogen peroxide is provided, including:

reacting hydrogen and oxygen using the catalyst having the polymer electrolyte multilayers prepared as above.

In an exemplary embodiment, this method may be performed in a liquid-phase reaction using a solvent containing 100 ppm or less of a halogen additive and substantially free of an acid promoter.

In an exemplary embodiment, this method may be performed at a reaction temperature of about 20 to 60° C. and at a reaction pressure of about 35 to 70 bar.

According to embodiments of the present disclosure, a catalyst having polymer electrolyte multilayers is prepared in such a manner that polymer electrolyte multilayers are formed on an anionic support and then treated with sulfuric acid, and Pt—Pd metal particles at a predetermined ratio are then dispersed in the polymer electrolyte multilayers, thus enabling hydrogen peroxide to be produced at high hydrogen conversion, hydrogen selectivity and hydrogen peroxide yield for a long period of time, compared to the conventional polymer electrolyte multilayers catalysts (especially, a catalyst disclosed in Korean Patent Application No. 2009-41657).

DESCRIPTION OF SPECIFIC EMBODIMENTS

The present embodiments may be accomplished by the following description. The following description is to be understood as disclosing embodiments of the present invention, and the present invention is not necessarily limited thereto.

Anionic Support

In an embodiment, a support has a predetermined electric charge to facilitate adsorption of a cationic polymer electrolyte, and can be made of an anionic resin material. The exemplary anionic resin may include a polymer resin having, at a side chain thereof, an anionic functional group selected from the group consisting of a sulfonic acid group, a carboxylic acid group, a phosphoric acid group, and a phosphonic acid group. Particularly useful is a polymer resin having a sulfonic acid functional group ($SO_3H^-$). Examples of the polymer resin having an anionic functional group may include fluorine-, benzimidazole-, polystyrene-, polyimide-, polyetherimide-, polyphenylenesulfide-, polysulfone-, polyethersulfone-, polyetherketone-, polyetheretherketone-, and polyphenylquinoxaline-based polymers, which may be used alone or in combination. Specific examples thereof may include poly(perfluorosulfonic acid) (under the brand name Nafion®), poly(perfluorocarboxylic acid), a copolymer of tetrafluoroethylene having a sulfonic acid group and fluorovinylether, defluorinated polyetherketone sulfide, arylketone, poly[2,2'-(m-phenylene)-5,5'-bibenzimidazole] and poly(2,5-benzimidazole). In an exemplary embodiment, an anionic support formed from the aforementioned polymer may have a spherical shape, with a diameter of about 0.1 to 5 mm and particularly about 0.3 to 1.5 mm.

Formation of Polymer Electrolyte Multilayers

In an embodiment, a polymer electrolyte, which is provided in the form of multilayers on the surface of the anionic support, includes a cationic polymer electrolyte and an anionic polymer electrolyte, and is prepared in such a manner that a cationic polymer electrolyte layer and an anionic polymer electrolyte layer are sequentially formed on a support.

Examples of the cationic polymer electrolyte may include, but are not limited to, poly(allylamine)hydrochloride (PAH), polydiallyldimethylammonium, poly(ethyleneimine), and poly(acrylamide-co-diallyldimethylammonium), which may be used alone or in combination. Particularly useful is PAH.

Examples of the anionic polymer electrolyte may include, but are not limited to, poly(4-styrenesulfonate) (PSS), poly(acrylic acid), poly(acrylamide), poly(vinylphosphonic acid), poly(2-acrylamido-2-methyl-11-propanesulfonic acid), poly(anetholsulfonic acid), and poly(vinylsulfonate), which may be used alone or in combination. Particularly useful is PSS.

The strength of ionic bonding of the polymer electrolyte can be controlled by appropriately selecting the cationic or anionic polymer electrolyte. During the subsequent procedures, when a Pt precursor and a Pd precursor are reduced (into elements) using a reductant, the size of the metal particles may be controlled. Also, the thickness of the polymer electrolyte multilayers may be adjusted by controlling the molecular weight of the polymer electrolyte, whereby the concentration and the particle size of inserted metals (Pt and Pd) may be controlled. In an embodiment, the molecular weight ($M_w$) of the polymer electrolyte may be in the range of, for example, about 500 to 500,000, particularly about 1,000 to 300,000, and more particularly about 20,000 to 100,000. In this regard, PAH may have $M_w$ of, for example, about 500 to 300,000, particularly about 1,000 to 100,000, and more particularly about 2,000 to 60,000. Also, PSS may have $M_w$ of, for example, about 5,000 to 500,000, particularly about 10,000 to 100,000, and more particularly about 40,000 to 80,000. Such numerical ranges are merely illustrative, but the present invention is not limited thereto.

In an exemplary embodiment, polymer electrolyte multilayers may be formed by preparing each of a cationic polymer electrolyte solution and an anionic polymer electrolyte solution, and bringing these solutions into sequential contact with an anionic support. As such, the solvent for use in preparation of the polymer electrolyte solution has a polarity enough to dissolve the cationic and the anionic polymer electrolyte, and examples thereof may include water, n-hexane, ethanol, triethylamine, tetrahydrofuran (THF), dimethyl sulfoxide (DMSO), ethylacetate, isopropylalcohol, acetone, acetonitrile, benzene, butylalcohol, chloroform, diethylether and mixtures thereof. More particularly, a polymer electrolyte solution may be in a form of an aqueous solution. The polymer electrolyte solution may have a concentration of, for example, about 0.01 to 500 mM, particularly about 0.1 to 100 mM, and more particularly about 1 to 10 mM.

The cationic polymer electrolyte solution may have a pH of, for example, about 5 to 9, and particularly about 6 to 9, and the anionic polymer electrolyte solution may have a pH of, for example, about 2 to 7, and particularly about 4 to 6. The thickness of the polymer electrolyte multilayers may be adjusted by controlling the pH of the polymer electrolyte solution, and thereby the concentration and the particle size of the dispersed (inserted) metal (Pt—Pd) may be controlled.

In an exemplary embodiment, sequentially forming the cationic polymer electrolyte layer and the anionic polymer electrolyte layer may be repeated two or more times. Although only a single combination of the cationic and the anionic polymer electrolyte multilayer may be formed on the support, a stacking step may be repeated so as to form two or more combinations. As such, the number of combinations of the multilayers may be set to, for example, 2 to 30, and particularly 2 to 15. In this embodiment, when the Pt—Pd particles are attached (inserted) between the polymer electrolyte layers rather than to the surface of the support, high activity may be obtained. Although an increase in the number of combinations of the polymer electrolyte multilayers may raise the hydrogen peroxide conversion, when the number of combinations thereof exceeds a certain number, the extent of improvement in the conversion may become insignificant. Hence, this number may be adjusted in the above range.

Sulfuric Acid Treatment

An embodiment of the present disclosure is featured in that sulfuric acid treatment is performed after formation of the polymer electrolyte multilayers on the anionic support. Although the present invention is not bound to any particular theory, compared to when sulfuric acid treatment is first performed on a support and then polymer electrolyte multilayers are formed or when treatment is conducted with an acid (e.g. nitric acid) other than sulfuric acid, the treatment as in this embodiment may function to supplement the anionic support with an acid group and also to supplement the polymer electrolyte layer with an anionic functional group and an acid group so that both hydrogen selectivity and hydrogen peroxide yield may be increased.

Sulfuric acid is provided in the form of an aqueous solution having a concentration of, for example, about 0.05 to 8 M, particularly about 0.1 to 4 M, and more particularly about 0.2 to 1.0 M. Also, sulfuric acid treatment may be performed once or at least two times, and washing after sulfuric acid treatment (after each sulfuric acid treatment when sulfuric acid treatment is performed two or more times) may be advantageously carried out. In an exemplary embodiment, sulfuric acid is brought into contact with the support having the polymer electrolyte multilayers at about 20 to 120° C. and particularly at 25 to 60° C. for about 5 to 600 min and particularly about 10 to 60 min. As such, sulfuric acid treatment may be implemented with stirring so as for more uniform contact.

Dispersion (Insertion) of Pt—Pd Metal Particles

In an embodiment of the present disclosure, both Pt and Pd as active metals are uniformly dispersed in the form of nano-sized particles in the polymer electrolyte multilayers. As such, the metal component is in a reduced state (i.e. in an element state). To this end, Pt and Pd precursors are inserted into the polymer electrolyte multilayers, and then reduced by a reductant and thus converted into metal particles. Examples of the Pt precursor may include, but are not limited to, tetrachloroplatinic acid (II) ($H_2PtCl_4$), hexachloroplatinic acid (IV) ($H_2PtCl_6$), potassium tetrachloroplatinate (II) ($K_2PtCl_4$), potassium hexachloroplatinate (IV) ($H_2PtCl_6$) and mixtures thereof. Also, examples of the Pd precursor may include, but are not limited to, palladium chloride ($PdCl_2$), sodium tetrachloropalladate ($Na_2PdCl_4$), palladium sulfate ($PdSO_4$), tetrachloropalladic acid (II) ($H_2PdCl_4$), potassium tetrachloropalladate ($K_2PdCl_4$) and mixtures thereof.

In an exemplary embodiment, the Pt and Pd precursors may be provided in the form of a solution. Also useful is a precursor solution obtained by adjusting the pH of the solution using an acid or a base as well as a typical solvent such as water (distilled water). The concentration of the Pt and Pd precursors in the solution may be, for example, about 0.05 to 10 mM, particularly about 0.2 to 5 mM, and more particularly about 0.5. to 2 mM. Also, the pH of the Pt and Pd precursor solution may be, for example, about 1 to 6, particularly about 1 to 5 and more particularly about 2 to 4.

The precursor solution is brought into contact with the support having the polymer electrolyte multilayers. As such, the impregnation may be performed so that the Pt and Pd precursors in the solution may be sufficiently inserted into the support. In this regard, the typical contact time with the precursor solution may be in a range of about 5 to 180 min, and particularly about 10 to 60 min.

As mentioned above, the Pt and Pd precursors inserted into the polymer electrolyte multilayers are converted into metal elements by a reductant. The reductant may include hydrogen and a chemical reductant known in the art, and it may be selected from among materials which could hardly leave any residue or impurity during the reduction procedure. Examples of the reductant may include, but are not limited to, sodium borohydride ($NaBH_4$), hydrazine ($N_2OH_4$), sodium formate (HCOONa), ammonium bicarbonate ($NH_4HCO_3$), and hydrogen ($H_2$), which may be used alone or in combination of two or more. Particularly useful is sodium borohydride ($NaBH_4$) or hydrogen ($H_2$).

By the reduction reaction as above, the Pt and Pd precursors have reduced (element) nanoparticles, and may be provided in the form of being uniformly dispersed throughout the polymer electrolyte multilayers having a predetermined thickness. The average size (particle size) of the Pt—Pd particles may be, for example, about 1 to 1000 nm, particularly about 1 to 500 nm, and more particularly about 1 to 100 nm. The Pd—Pt thus synthesized may be provided in the form of an alloy and/or a combination of individual metal particles.

The resulting polymer electrolyte multilayers may form a physicochemically stable structure by virtue of electrostatic interaction, hydrogen bonding, van der Waals interaction and/or covalent bonding between individual layers thereof, and the Pt—Pd particles inserted into the polymer electrolyte multilayers may be present in the form of being encapsulated or embedded. Furthermore, the inserted Pt—Pd particles are strongly bonded to the polymer electrolyte multilayers by electrostatic interaction, hydrogen bonding, van der Waals interaction and/or covalent bonding. Compared to when a metal is loaded on a typical support (alumina, etc.), the catalyst of the invention may effectively suppress the deterioration of activities due to dissolution during synthesis of hydrogen peroxide.

The total amount of the metal component in the catalyst having Pt—Pd dispersed polymer electrolyte multilayers may be, for example, about 0.01 to 5 wt %, particularly about 0.1 to 0.5 wt % and more particularly about 0.2 to 0.4 wt %. The Pt/Pd atomic ratio may be about 0.02 to 0.15, particularly about 0.03 to 0.13, and more particularly 0.05 to 0.1. If the relative amount of Pt is excessively high, the produced hydrogen peroxide may be actively decomposed, thus lowering the hydrogen selectivity and the hydrogen peroxide yield. Hence, upon preparation of the Pt/Pd precursor solution, respective precursor amounts may be appropriately adjusted in consideration of the Pt/Pd atomic ratio of the final metal particles.

Production of Hydrogen Peroxide

An embodiment of the present disclosure addresses a method of directly producing hydrogen peroxide from hydrogen and oxygen in the presence of the catalyst prepared as above. As such, the reaction may be carried out in a liquid medium, especially a liquid medium substantially free of an acid promoter (i.e. liquid reaction) Examples of the reaction medium (solvent) may include methanol, ethanol and/or water. The reactor may include a tube reactor, a fixed-bed reactor, an ebullated reactor, or a slurry reactor, as known in the art. Depending on the type of reactor, the catalyst may be prepared in the form of beads or spheres. As such, the reactor may be equipped with a cooling jacket so that the reaction temperature is maintained constant.

Upon synthesis of hydrogen peroxide, oxygen and hydrogen reactants may be used in the form of a gas mixture diluted with inert gas (nitrogen) to reduce the risk of explosion. In an exemplary embodiment, the volume ratio of oxygen and nitrogen relative to hydrogen upon reaction may be about 5 to 18 (particularly about 12 to 15) and about 10 to 30 (particularly about 17 to 20), respectively. Also, the rate ratio of the total gas:the solvent in the reaction may be, for example, about 500 to 10,000 and particularly about 1,200 to 5,000. The reaction pressure may be about 35 to 70 bar (particularly about 45 to 60 bar), and the reaction temperature may be about 20 to 60° C. (particularly, about 30 to 50° C.).

In an exemplary embodiment, to prevent the corrosion in the reactor upon reaction, a small amount of a halogen additive may be added to the reaction system, if necessary, without the use of an acid. Examples of the halogen additive may include hydrobromic acid, sodium bromide (NaBr), and potassium bromide (KBr), and the amount of the halogen additive may be, for example, about 100 ppm or less, particularly about 1 to 100 ppm and more particularly about 5 to 50 ppm, based on the weight of the reaction medium. Especially, the amount of the halogen additive may fall in the range of about 10 to 20 ppm.

As mentioned above, in the catalyst prepared according to the embodiment of the present disclosure, the initial catalytic activities (hydrogen conversion, hydrogen selectivity, and hydrogen peroxide yield) are equal to or greater than those of the conventional polymer electrolyte multilayers catalysts. Especially, such catalytic activities may be maintained even after a long period of time. For example, after 1000 hr, the initial hydrogen conversion and hydrogen selectivity may be decreased by, for example, about 2% or less (particularly about 0.2% or less) and about 5% or less (particularly about 2% or less), respectively. Furthermore, the hydrogen conversion, the hydrogen selectivity and the hydrogen peroxide yield are about 98% or more, about 75% or more and about 8% or more, respectively.

A better understanding of the present invention may be obtained via the following examples, which are set forth to illustrate, but are not to be construed as limiting the present invention.

Preparation of Polymer Electrolyte Solution and Metal Precursor Solution

A 10 mM PAH (Poly(allylamine)hydrochloride; $M_w$: 56,000) aqueous solution (pH 6) and a 10 mM PSS (Poly (4-styrenesulfonate; $M_w$: 56,000) aqueous solution (pH 6), respectively, were prepared. Further, a Pd precursor $K_2PdCl_4$ and a Pt precursor $K_2PtCl_4$ were used at a ratio of 9.5:0.5 (based on the metal atom), and thus a 1 mM Pt—Pd precursor solution was prepared. This precursor solution had a pH of 3. As such, pH was adjusted using hydrochloric acid and sodium hydroxide. For the subsequent testing, Pt—Pd precursor solutions were prepared using the Pt precursor and the Pd precursor at different ratios.

Separately, for comparison, a Pt precursor solution and a Pd precursor solution were respectively prepared, with a concentration of 1 mM and a pH of 3.

Example 1

10 g of an anionic resin having a sulfonic acid functional group was added to 300 mL of distilled water and washed three times for 10 min. The distilled water for washing was removed, and 300 mL of a PAH aqueous solution was placed in a beaker containing the washed anionic resin and stirred for 30 min. The PAH aqueous solution remaining in the beaker was removed, followed by washing three times for 5 min with 300 mL of distilled water. 300 mL of a PSS aqueous solution was placed in the beaker containing the anionic resin having the PAH layer and stirred for 30 min, and the PSS solution remaining in the beaker was removed, followed by washing three times for 5 min with 300 mL of distilled water, thereby obtaining a multilayer structure configured such that PAH and PSS were sequentially formed on the anionic resin.

A 0.5 M sulfuric acid ($H_2SO_4$) solution (available from Fluka) was placed in the beaker containing the multilayer structure and stirred for 30 min. The sulfuric acid solution remaining in the beaker was removed, followed by washing three times for 5 min with 300 mL of distilled water.

The layer structure treated with sulfuric acid as above was added to 250 mL of a Pt—Pd precursor aqueous solution and stirred for 30 min, after which the precursor solution remaining in the beaker was removed, followed by washing three times for 5 min with 300 mL of distilled water.

The layer structure having inserted (impregnated) Pt—Pd precursors was added to 300 mL of distilled water, reduced while 20 mL of a 50 mM $NaBH_4$ aqueous solution (available from Sigma-Aldrich) was slowly added droplets with stirring, and then further stirred for 30 min. The remaining reductant solution was removed, followed by washing three times for 5 min with 300 mL, of distilled water, thus obtaining a catalyst having Pt—Pd particles dispersed in polymer electrolyte multilayers. Based on the analytical results by ICP, the amount of active metals (Pt—Pd) in the obtained catalyst was 0.3 wt %, and the Pt/Pd atomic ratio was 5/95. Also, the particle size of the active metals was 5 nm.

Using the catalyst prepared by the above procedures, oxygen and hydrogen were reacted to thus produce hydrogen peroxide, as described below.

10 cc of the catalyst was placed in a self-made tube reactor provided with a cooling water jacket, and washed with methanol for 3 hr at 25° C. and 1 bar. Subsequently, methanol containing 15 ppm of HBr was used as the solvent instead of methanol alone and the reaction pressure was increased to 50 bar, after which the reaction was carried out under the condition that a volume ratio of hydrogen:oxygen:nitrogen was 3:40:57 and a rate ratio of total gas:solvent was maintained at about 3200. The hydrogen conversion, hydrogen selectivity and hydrogen peroxide yield were measured at the initial reaction, after 100 hr and after 1000 hr. As such, the hydrogen peroxide yield was calculated via titration, and the hydrogen selectivity was analyzed by gas chromatography. The results are shown in Table 1 below.

Comparative Examples 1 and 2

Catalysts were prepared in the same manner as in Example 1, with the exception that a Pd precursor solution (Comparative Example 1) and a Pt precursor solution (Comparative Example 2) were used alone, in lieu of the Pt—Pd precursor solution, and sulfuric acid treatment was not performed. Using the catalysts thus prepared, hydrogen peroxide was produced in the same manner as in Example 1. The results are shown in Table 1 below.

Comparative Example 3

A catalyst having Pt—Pd dispersed in polymer electrolyte multilayers was prepared in the same manner as in Example 1, with the exception that sulfuric acid treatment was not performed. Using the catalyst thus prepared, hydrogen peroxide was produced in the same manner as in Example 1. The results are shown in Table 1 below.

Comparative Example 4

A catalyst having Pd dispersed in polymer electrolyte multilayers was prepared in the same manner as in Example 1, with the exception that only a Pd precursor was used. Using the catalyst thus prepared, hydrogen peroxide was produced. The results are shown in Table 1 below.

TABLE 1

| Catalyst | Initial | | | 100 hr | | | 1000 hr | | |
|---|---|---|---|---|---|---|---|---|---|
| | $H_2$ Conversion | $H_2$ Selectivity | $H_2O_2$ Yield | $H_2$ Conversion | $H_2$ Selectivity | $H_2O_2$ Yield | $H_2$ Conversion | $H_2$ Selectivity | $H_2O_2$ Yield |
| C. Ex. 1 | 100% | 76% | >8 wt % | 100% | 76% | >8 wt % | 85% | 73% | >8 wt % |
| C. Ex. 2 | 70% | 25% | 4.5 wt % | 39% | 7.9% | 0.6 wt % | — | — | — |
| C. Ex. 3 | 100% | 78% | >8 wt % | 100% | 78% | >8 wt % | 97 | 60% | >8 wt % |
| C. Ex. 4 | 100% | 76% | >8 wt % | 100% | 75% | >8 wt % | 89% | 74% | >8 wt % |
| Ex. 1 | 100% | 78% | >8 wt % | 100% | 78% | >8 wt % | 100% | 77% | >8 wt % |

As is apparent from Table 1, in Comparative Example 1 using the Pd catalyst without sulfuric acid treatment, the hydrogen selectivity and the hydrogen peroxide yield were maintained to be similar to those of the initial reaction over time, but the hydrogen conversion was lowered. In Comparative Example 2 using the Pt catalyst without sulfuric acid treatment, all of the hydrogen conversion, hydrogen selectivity and hydrogen peroxide yield were low from the initial reaction, and the catalytic activities were drastically deteriorated despite a lapse of a slight period of time. In Comparative Example 3 using the Pt—Pd binary catalyst without sulfuric acid treatment, the hydrogen conversion and the hydrogen peroxide yield were maintained to be similar to those of the initial reaction over time, but the hydrogen selectivity was remarkably lowered. Also in Comparative Example 4 using the Pd catalyst treated with sulfuric acid, the hydrogen peroxide yield was maintained over time, but the hydrogen conversion and the hydrogen selectivity were lowered.

In contrast, in Example 1 using the Pt—Pd binary catalyst treated with sulfuric acid, the hydrogen conversion, hydrogen selectivity and hydrogen peroxide yield were superior from the initial reaction and high catalytic activities were maintained even upon long-term reaction.

Evaluation of Long-Term Activity

Using the catalysts of Comparative Examples 1, 3 and 4 and Example 1, long-term activity was evaluated. The results are shown in Table 2 below.

TABLE 2

| Catalyst | Initial | | | 1000 hr | | | Long-term activity | | |
|---|---|---|---|---|---|---|---|---|---|
| | $H_2$ Conversion | $H_2$ Selectivity | $H_2O_2$ Yield | $H_2$ Conversion | $H_2$ Selectivity | $H_2O_2$ Yield | $H_2$ Conversion | $H_2$ Selectivity | $H_2O_2$ Yield |
| C. Ex. 1 | 100% | 76% | >8 wt % | 85% | 73% | >8 wt % | — | — | — |
| C. Ex. 3 | 100% | 78% | >8 wt % | 97% | 60% | >8 wt % | — | — | — |
| C. Ex. 4 | 100% | 76% | >8 wt % | 89% | 74% | >8 wt % | 44% | 1300 hr 22% | 1.5 wt % |
| Ex. 1 | 100% | 78% | >8 wt % | 100% | 77% | >8 wt % | 91% | 3000 hr 75% | >8 wt % |

As is apparent from Table 2, in Comparative Example 4 using the Pd catalyst treated with sulfuric acid, the hydrogen conversion, hydrogen selectivity and hydrogen peroxide yield were lowered to the extent of being inappropriate for use in commercial processes after 1300 hr. However, the Pt—Pd binary catalyst treated with sulfuric acid (Example 1) maintained high catalytic activities even after 3000 hr.

Evaluation of Effect Depending on Pt/Pd Atomic Ratio

Catalysts having Pt—Pd dispersed in polymer electrolyte multilayers were prepared in the same manner as in Example 1, with the exception that the Pt/Pd atomic ratio was changed while the total amount of the binary metal (Pt—Pd) inserted into the catalyst was maintained constant, and hydrogen peroxide was produced using the prepared catalysts. The results are shown in Table 3 below.

TABLE 3

| Catalyst | 500 hr | | |
|---|---|---|---|
| Pt/Pd atomic ratio | $H_2$ Conversion | $H_2$ Selectivity | $H_2O_2$ Yield |
| 0.005 (for comparison) | 100% | 75% | >8 wt % |
| 0.01 (for comparison) | 100% | 77% | >8 wt % |
| 0.05 (inventive) | 100% | 78% | >8 wt % |
| 0.10 (inventive) | 100% | 78% | >8 wt % |
| 0.40 (for comparison) | 100% | 65% | >8 wt % |

As is apparent from Table 3, when the Pt/Pd atomic ratio was lower or higher than a predetermined level, the hydrogen conversion and the hydrogen peroxide yield were maintained to some extent, but the hydrogen selectivity was decreased.

Evaluation of Effect Depending on Sequence of Sulfuric Acid Treatment

Comparative Example 5

10 g of an anionic resin having a sulfonic acid functional group was added to 300 mL of distilled water and washed three times for 10 min. The distilled water for use in washing was removed, and a 0.5 M sulfuric acid ($H_2SO_4$) solution (available from Fluka) was added to a beaker containing the washed anionic resin and stirred for 30 min. Thereafter, the sulfuric acid solution remaining in the beaker was removed, followed by washing three times for 5 min with 300 mL of distilled water. Subsequently, 300 mL of a PAH aqueous solution was placed in the beaker containing the anionic resin treated with sulfuric acid, and then stirred for 30 min. The PAH aqueous solution remaining in the beaker was removed, followed by washing three times for 5 min with 300 mL of distilled water. 300 mL of a PSS aqueous solution was placed in the beaker containing the anionic resin having the PAH layer, and then stirred for 30 min. The PSS aqueous solution remaining in the beaker was removed, followed by washing three times for 5 min with 300 mL of distilled water, thus obtaining a structure configured such that PAH and PSS were sequentially formed on the sulfuric acid-treated anionic resin. Subsequently, Pt—Pd precursor insertion and reduction were carried out as in Example 1, thus preparing a catalyst having Pt—Pd dispersed in polymer electrolyte multilayers, and hydrogen peroxide was produced using such a catalyst. The results are shown in Table 4 below.

TABLE 4

| Catalyst | Initial | | | 1000 hr | | |
|---|---|---|---|---|---|---|
| | $H_2$ Conversion | $H_2$ Selectivity | $H_2O_2$ Yield | $H_2$ Conversion | $H_2$ Selectivity | $H_2O_2$ Yield |
| C. Ex. 5 | 100% | 76% | >8 wt % | 88% | 73% | >8 wt % |
| Ex. 1 | 100% | 78% | >8 wt % | 100% | 77% | >8 wt % |

As is apparent from Table 4, compared to Example 1, in Comparative Example 5 where the anionic support was treated with sulfuric acid and then the polymer electrolyte multilayers were formed thereon, the hydrogen conversion and the hydrogen peroxide yield were similar, but the hydrogen selectivity was decreased. This is considered to be because the acid group supplemented to the anionic support and the acid group and the anionic functional group supplemented to the polymer electrolyte layer contribute to an increase in the selectivity.

Evaluation of Effect Depending on Kind of Acid

Comparative Example 6

A catalyst having Pt—Pd dispersed in polymer electrolyte multilayers was prepared in the same manner as in Example 1, with the exception that nitric acid treatment was performed instead of the sulfuric acid treatment, and hydrogen peroxide was produced using the prepared catalyst. The results are shown in Table 5 below.

TABLE 5

| Catalyst | Initial | | | 1000 hr | | | $H_2$ Conversion | $H_2$ Selectivity | $H_2O_2$ Yield |
|---|---|---|---|---|---|---|---|---|---|
| | $H_2$ Conversion | $H_2$ Selectivity | $H_2O_2$ Yield | $H_2$ Conversion | $H_2$ Selectivity | $H_2O_2$ Yield | | | |
| C. Ex. 6 | 100% | 76% | >8 wt % | 98% | 75% | >8 wt % | 68% | 1500 hr 65% | 6.7 wt % |
| Ex. 1 | 100% | 78% | >8 wt % | 100% | 77% | >8 wt % | 91% | 3000 hr 75% | >8 wt % |

As is apparent from Table 5, compared to the nitric acid-treated Pt—Pd catalyst, the sulfuric acid-treated Pt—Pd catalyst was similar in terms of the catalytic activities other than the hydrogen selectivity upon initial reaction, but all of the catalytic activities were significantly superior over time.

Accordingly, modifications or variations of the present invention may be easily utilized by those having ordinary knowledge in the art, and should also be understood as falling within the scope of the present invention.

What is claimed is:

1. A method of preparing a catalyst having polymer electrolyte multilayers, comprising:
   a) sequentially forming a cationic polymer electrolyte layer and an anionic polymer electrolyte layer on an anionic support to form polymer electrolyte multilayers;
   b) treating the polymer electrolyte multilayers of step a) with sulfuric acid; and
   c) loading or inserting a Pt precursor and a Pd precursor into the polymer electrolyte multilayers treated with sulfuric acid in step b), and reducing the Pt precursor and the Pd precursor by a reductant to form Pt—Pd metal particles dispersed in the polymer electrolyte multilayers,
   wherein a Pt/Pd atomic ratio in the reduced Pt—Pd metal particles is 0.02 to 0.15.

2. The method of claim 1, wherein the anionic support has a sulfonic acid functional group.

3. The method of claim 1, wherein step a) is repeated two or more times.

4. The method of claim 1, wherein step a) is performed by bringing a cationic polymer electrolyte solution and an anionic polymer electrolyte solution into sequential contact with the anionic support.

5. The method of claim 1, wherein the cationic polymer electrolyte is poly(allylamine)hydrochloride, polydiallyldimethylammonium, poly(ethyleneimine), poly(acrylamide-co-diallyldimethylammonium) or a combination thereof.

6. The method of claim 1, wherein the anionic polymer electrolyte is poly(4-styrenesulfonate), poly(acrylic acid), poly(acrylamide), poly(vinylphosphonic acid), poly(2-acrylamido-2-methyl-11-propanesulfonic acid), poly(anetholesulfonic acid), poly(vinylsulfonate) or a combination thereof.

7. The method of claim 4, wherein a solvent for the cationic polymer electrolyte solution and the anionic polymer electrolyte solution is water, n-hexane, ethanol, triethylamine, tetrahydrofuran (THF), dimethyl sulfoxide (DMSO), ethylacetate, isopropylalcohol, acetone, acetonitrile, benzene, butylalcohol, chloroform, diethylether, or a mixture thereof.

8. The method of claim 1, wherein the sulfuric acid used in step b) is an aqueous sulfuric acid solution with a concentration of 0.05 to 8 M.

9. The method of claim 8, wherein step b) is performed by bringing the aqueous sulfuric acid solution into contact with the polymer electrolyte multilayers at 20 to 120° C. for 5 to 600 min.

10. The method of claim 1, wherein step c) comprises bringing a solution containing the Pt precursor and the Pd precursor into contact with the support having the polymer electrolyte multilayers,
   wherein the Pt precursor and the Pd precursor in the solution have a concentration of 0.05 to 10 mM.

11. The method of claim 10, wherein the solution containing the Pt precursor and the Pd precursor has a pH of 1 to 6.

12. The method of claim 1, wherein an amount of the reduced Pt—Pd metal particles in the catalyst is 0.01 to 5 wt %.

13. The method of claim 1, wherein the Pt/Pd atomic ratio in the reduced Pt—Pd metal particles is 0.05 to 0.1.

14. The method of claim 1, wherein the reduced Pt—Pd metal particles have a size of 1 to 100 nm.

15. A method of producing hydrogen peroxide, comprising:
   1) preparing a catalyst having polymer electrolyte multilayers, wherein said preparing comprises:
      a) sequentially forming a cationic polymer electrolyte layer and an anionic polymer electrolyte layer on an anionic support to form polymer electrolyte multilayers;
      b) treating the polymer electrolyte multilayers of step a) with sulfuric acid; and
      c) loading or inserting a Pt precursor and a Pd precursor into the polymer electrolyte multilayers treated with sulfuric acid in step b), and reducing the Pt precursor and the Pd precursor by a reductant to form Pt-Pd metal particles dispersed in the polymer electrolyte multilayers, wherein a Pt/Pd atomic ratio in the reduced Pt-Pd metal particles is 0.02 to 0.15;

2) reacting hydrogen and oxygen using the catalyst having polymer electrolyte multilayers.

16. The method of claim 15, wherein the reaction is performed in a liquid-phase reaction using a solvent containing 100 ppm or less of a halogen additive and free of an acid promoter.

17. The method of claim 15, wherein the reaction is performed at a reaction temperature of 20 to 60° C. and at a reaction pressure of 35 to 70 bar.

* * * * *